(12) United States Patent
Takeda et al.

(10) Patent No.: US 7,079,378 B2
(45) Date of Patent: Jul. 18, 2006

(54) ELECTROLYTIC SOLUTION FOR ELECTROLYTIC CAPACITOR AND ELECTROLYTIC CAPACITOR USING THE SAME

(75) Inventors: Masayuki Takeda, Ibaraki (JP); Takako Takahashi, Ibaraki (JP); Makoto Ue, Ibaraki (JP); Tatsunori Tsuji, Tokyo (JP); Masashi Ozawa, Tokyo (JP)

(73) Assignees: Nippon Chemi-Con Corporation, Tokyo (JP); Mitsubishi Chemical Corporation, Tokyo (JP)

( * ) Notice: Subject to any disclaimer, the term of this patent is extended or adjusted under 35 U.S.C. 154(b) by 410 days.

(21) Appl. No.: 10/239,206

(22) PCT Filed: Mar. 27, 2001

(86) PCT No.: PCT/JP01/02438

§ 371 (c)(1),
(2), (4) Date: Jan. 13, 2003

(87) PCT Pub. No.: WO01/73802

PCT Pub. Date: Oct. 4, 2001

(65) Prior Publication Data

US 2003/0152838 A1    Aug. 14, 2003

(30) Foreign Application Priority Data

Mar. 27, 2000 (JP) ............................ 2000-85607
Dec. 4, 2000 (JP) ............................ 2000-368633

(51) Int. Cl.
*H01G 9/02* (2006.01)
(52) U.S. Cl. .................................... 361/505; 252/62.2
(58) Field of Classification Search ........ 361/502–505; 252/62.2
See application file for complete search history.

(56) References Cited

FOREIGN PATENT DOCUMENTS

| EP | 0 684 620 | 11/1995 |
| JP | 4-58512 | 2/1992 |
| JP | 9-148196 | 6/1997 |
| JP | 10-135081 | 5/1998 |

OTHER PUBLICATIONS

Patent Abstracts of Japan, JP 10-135081, May 22, 1998.
Patent Abstracts of Japan, JP 09-148196, Jun. 6, 1997.

*Primary Examiner*—Eric W. Thomas
(74) *Attorney, Agent, or Firm*—Oblon, Spivak, McClelland, Maier & Neustadt, P.C.

(57) ABSTRACT

An object of the present invention is to provide an electrolyte for an electrolytic capacitor, which is advantageous not only in that both electric conductivity and withstand voltage property are high, but also in that thermal stability is excellent, and an electrolytic capacitor using the electrolyte. Specifically, the present invention provides an electrolyte for an electrolytic capacitor, comprising a solvent, at least one quaternary amidinium salt selected from the group consisting of a quaternary amidinium salt of a hydroxy-substituted aromatic monocarboxylic acid and a quaternary amidinium salt of phthalic acid, and metal oxide particles, and an electrolytic capacitor using the electrolyte.

15 Claims, 1 Drawing Sheet

ELECTROLYTIC SOLUTION FOR ELECTROLYTIC CAPACITOR AND ELECTROLYTIC CAPACITOR USING THE SAME

FIELD OF THE INVENTION

The present invention relates to an electrolyte for an electrolytic capacitor and an electrolytic capacitor using the same. More particularly, the present invention is concerned with an electrolyte for an electrolytic capacitor containing a quaternary amidinium salt of a specific carboxylic acid as a solute and organosol of metal oxide particles and an electrolytic capacitor using the electrolyte.

BACKGROUND ART

Electrolytic capacitors have an advantage that they have large capacitance despite a small size, and therefore they are widely used in a low frequency filter and for by-pass The electrolytic capacitors generally have a structure such that an anode foil and a cathode foil intermediated by a separator are spirally wound together and placed and sealed in a casing (see FIGS. 1 and 2). As an anode foil, a valve metal such as aluminum or tantalum, having an insulating oxide film thereon as a dielectric layer is generally used, and as a cathode foil, an etched aluminum foil is generally used. For preventing short-circuiting between the anode and the cathode, the separator disposed therebetween is impregnated with an electrolyte, and it functions as a true cathode. Thus, the electrolyte is an important constituent which largely affects the properties of the electrolytic capacitor.

In the properties of the electrolyte, electric conductivity directly affects the energy loss and impedance properties of the electrolytic capacitor, and therefore, studies are being made intentionally on development of an electrolyte having high electric conductivity. For example, International Patent Publication No. WO95/15572 and Japanese Prov. Patent Publication No. 283379/1997 propose an electrolyte comprising a quaternary amidinium salt of phthalic acid or maleic acid dissolved in an aprotic solvent such as γ-butyrolactone. The electrolyte of this type has high electric conductivity; however, it has a problem that withstand voltage property is low. Generally, it is necessary that an electrolyte for an electrolytic capacitor should have higher withstand voltage than the rated voltage thereof. The electrolyte using a quaternary amidinium salt of phthalic acid or maleic acid can be used only in an electrolytic capacitor at rated voltage of 35 V or lower.

For solving the above problem, Japanese Prov. Patent Publication No. 135081/1998 proposes an electrolyte comprising a quaternary amidinium salt of benzoic acid as a solute and an organosol of metal oxide particles such as silica. This electrolyte has both high electric conductivity and high withstand voltage property, and hence, can be used in an electrolytic capacitor at rated voltage of up to 100 V. However, this electrolyte has unsatisfactory thermal stability and therefore, it cannot be used in an electrolytic capacitor operated in a high temperature environment at 125° C. or higher.

DISCLOSURE OF THE INVENTION

An object of the present invention is to solve the problems accompanying the prior art.

Specifically, an object of the present invention is to provide an electrolyte for an electrolytic capacitor, which is advantageous not only in that both electric conductivity and withstand voltage property are high, but also in that thermal stability is excellent, and an electrolytic capacitor using the electrolyte.

Particularly, an object of the present invention is to provide an electrolyte for an electrolytic capacitor, which can realize a long-lived electrolytic capacitor.

Further, an object of the present invention is to provide an electrolyte for an electrolytic capacitor, which can be industrially supplied stably and produced at a low cost and an electrolytic capacitor using the electrolyte.

For attaining the above objects, the present inventors have made extensive and intensive studies. As a result, they have found that, by using a quaternary amidinium salt of specific carboxylic acids as a solute and metal oxide particles in an electrolyte, an excellent electrolyte having a desired effect can be obtained, and thus the present invention has been completed.

Specifically, in the present invention, there is provided an electrolyte for an electrolytic capacitor, comprising: a solvent; at least one quaternary amidinium salt selected from the group consisting of a quaternary amidinium salt of a hydroxy-substituted aromatic monocarboxylic acid and a quaternary amidinium salt of phthalic acid; and metal oxide particles.

In addition, in the present invention, there is provided an electrolytic capacitor using the above electrolyte for an electrolytic capacitor.

DESCRIPTION OF REFERENCE NUMERALS

Figure 1:
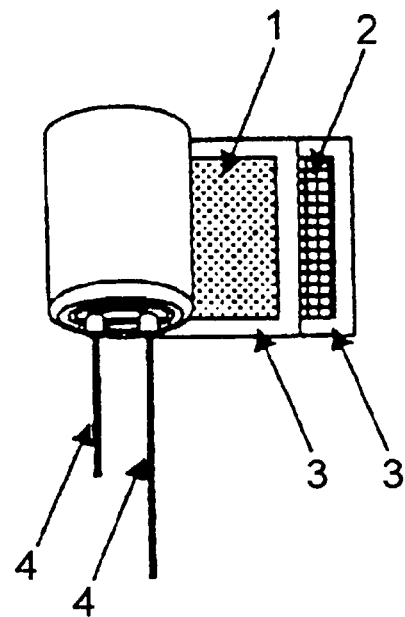
FIG. 1 is a perspective view of a spirally wound-form element of an electrolytic capacitor.

1: Anode foil
2: Cathode foil
3: Separator
4: Lead wire
5: Sealing material
6: Outer casing

BEST MODE FOR CARRYING OUT THE INVENTION

Hereinbelow, the electrolyte for an electrolytic capacitor and the electrolytic capacitor of the present invention will be described in more detail.

The electrolyte for an electrolytic capacitor of the present invention is characterized in that it contains at least one amidinium salt selected from the group consisting of a quaternary amidinium salt of a hydroxy-substituted aromatic monocarboxylic acid and a quaternary amidinium salt of phthalic acid. In the electrolyte for an electrolytic capacitor of the present invention, by using at least one carboxylic acid selected from the group consisting of a hydroxy-substituted aromatic monocarboxylic acid and phthalic acid as an anion component, there can be provided an electrolyte for an electrolytic capacitor, which is advantageous not only in that both electric conductivity and withstand voltage property are high, but also in that thermal stability and practical performance are excellent.

The term "a hydroxy-substituted aromatic monocarboxylic acid" used in the present specification means a compound having at least one hydroxyl group directly bonded to carbon atom(s) constituting an aromatic ring in an aromatic monocarboxylic acid. The number of hydroxyl group is preferably 3 or less, more preferably 2 or less, further preferably 1. With respect to the type of the aromatic ring, there is no particular limitation, but a benzene ring or a naphthalene ring is preferred.

Specific preferred examples of the hydroxy-substituted aromatic monocarboxylic acids include salicylic acid, 3-hydroxybenzoic acid, 4-hydroxybenzoic acid, 1-hydroxy-2-naphthoic acid, 3-hydroxy-2-naphthoic acid, 6-hydroxy-2-naphthoic acid and mixtures thereof. Of these, preferred are salicylic acid, 4-hydroxybenzoic acid, 3-hydroxy-2-naphthoic acid and mixtures thereof.

In the electrolyte of the present invention, as a cation component, quaternary amidinium ions are used. Specific preferred examples of quaternary amidinium salts as a source of the quaternary amidinium ions include a 1,3-dimethylimidazolinium salt, a 1-ethyl-3-methylimidazolinium salt, a 1,2,3-trimethylimidazolinium salt, a 1-ethyl-2,3-dimethylimidazolinium salt, a 1,2,3,4-tetramethylimidazolinium salt, a 1-ethyl-2,3,4-trimethylimidazolinium salt, a 1,3,4-trimethyl-2-ethylimidazolinium salt, a 1,2,3-trimethyl-3,4,5,6-tetrahydropyrimidinium salt, a 5-methyl-1,5-diazabicyclo[4.3.0]-nonene-5 salt, an 8-methyl-1,8-diazabicyclo[5.4.0]-undecene-7 salt, a 1,3-dimethylimidazolium salt, a 1-ethyl-3-methylimidazolium salt and mixtures thereof. Of these, preferred are a 1-ethyl-2, 3-dimethylimidazolinium salt and a 1,2,3,4-tetramethylimidazolinium salt, and especially preferred is a 1-ethyl-2,3-dimethylimidazolinium salt.

As an example of a method for preparing a quaternary amidinium salt of a hydroxy-substituted aromatic monocarboxylic acid, there can be mentioned a method in which an amidine, specifically 1-ethyl-2-methyl-1-imidazoline is reacted with dimethyl carbonate in methanol (quaternarization reaction), and the resultant methanol solution of methylamidinium carbonate, specifically methyl(1-ethyl-2,3-dimethylimidazolinium) carbonate is reacted with a hydroxy-substituted aromatic monocarboxylic acid in an equimolar amount (neutralization-decarboxylation reaction), and then, methanol is distilled off.

As an example of a method for preparing a quaternary amidinium salt of phthalic acid, there can be mentioned a method in which an amidine, specifically 1-ethyl-2-methyl-1-imidazoline is reacted with dimethyl carbonate in methanol (quaternarization reaction), and the resultant methanol solution of methylamidinium carbonate, specifically methyl (1-ethyl-2,3-dimethylimidazolinium) carbonate is reacted with phthalic acid in an equimolar amount (neutralization-decarboxylation reaction), and then, methanol is distilled off to obtain an amidinium salt of phthalic acid, specifically (1-ethyl-2,3-dimethylimidazolinium) hydrogenphthalate.

In the electrolyte for an electrolytic capacitor of the present invention, at least one quaternary amidinium salt selected from the group consisting of a quaternary amidinium salt of a hydroxy-substituted aromatic monocarboxylic acid and a quaternary amidinium salt of phthalic acid is contained as a solute preferably in an amount of 5 to 40% by weight, more preferably 10 to 25% by weight, based on the total weight of the quaternary amidinium salt and the solvent.

In the present specification, the expression " . . . to . . . " means a range including the values appearing before and after the word "to" as the lower limit and the upper limit, respectively.

As the solute component, other known substances, for example, an aromatic carboxylic acid, an aliphatic carboxylic acid and amidinium salts thereof can be used as long as the desired effects of the present invention are not sacrificed.

With respect to the solvent used in the electrolyte for an electrolytic capacitor of the present invention, there is no particular limitation, and there can be used, for example, lactones such as γ-butyrolactone, δ-valerolactone and γ-valerolactone; cyclic sulfones such as sulfolane, 3-methylsulfolane, 2,4-dimethylsulfolane and pentamethylenesulfone; and organic polar solvents publicly known as a solvent for use in an electrolytic capacitor such as ethylene glycol, methyl cellosolve and dimethylformamide. In the electrolyte for an electrolytic capacitor of the present invention, it is preferred to use at least one solvent selected from the group consisting of a lactone and a cyclic sulfone. Especially, it is preferred that the above-mentioned lactone is γ-butyrolactone and the above-mentioned cyclic sulfone is at least one cyclic sulfone selected from the group consisting of sulfolane and 3-methylsulfolane. In the electrolyte for an electrolytic capacitor of the present invention, when γ-butyrolactone is used as a main solvent (the wording "when γ-butyrolactone is used as a main solvent" means the case where no cyclic sulfone is used and the γ-butyrolactone solvent contains a solvent other than the cyclic sulfone, for example, ethylene glycol, etc.), the solvent other than γ-butyrolactone is preferably contained in an amount of 40 parts by weight or less wherein the lower limit is generally 0.1 part by weight, further preferably 1 to 30 parts by weight, especially preferably 1 to 20 parts by weight, relative to 100 parts by weight of γ-butyrolactone.

Further, in the electrolyte for an electrolytic capacitor of the present invention, it is preferred that the at least one solvent selected from the group consisting of a lactone and a cyclic sulfone further contains ethylene glycol. In this case, the ratio between the total weight of at least one solvent selected from the group consisting of a lactone and a cyclic sulfone and the weight of ethylene glycol may be 99:1 to 70:30, preferably 99:1 to 75:25, further preferably 99:1 to 85:15.

In the electrolyte for an electrolytic capacitor of the present invention, by selecting a lactone and/or a cyclic sulfone as a preferred solvent, it is possible to obtain an electrolyte which can be used in a wide range of temperatures, and also exhibits excellent stability for a long period of time. Further, by mixing ethylene glycol into the solvent, the below-described metal oxide particles are in a stable sol state in the electrolyte, enabling the electrolyte to have high withstand voltage property for a long period of time even at high temperatures. When using both the lactone and the cyclic sulfone, with respect to the preferred mixing ratio between the lactone and the cyclic sulfone, there is no particular limitation. In this case, the electrolyte performance has a tendency that the higher the ratio of the cyclic sulfone contained in the electrolyte, the more excellent the properties at high temperatures, or the poorer the properties at low temperatures. Therefore, the mixing ratio between the lactone and the cyclic sulfone may be appropriately selected depending on the electrolyte performance required for an individual electrolytic capacitor, for example, the mixing ratio between the lactone and the cyclic sulfone is preferably 10:90 to 90:10, further preferably 80:20 to 20:80, in terms of the weight ratio.

Further, in the electrolyte for an electrolytic capacitor of the present invention, an organic polar solvent such as glycerol, methyl cellosolve and dimethylformamide or water can be used. When using such a solvent, the solvent is preferably used as a sub-solvent. In such a case, the mixing ratio of the sub-solvent is preferably 10% by weight or less, more preferably 5% by weight or less, wherein the lower limit is generally 0.1% by weight or more, based on the total weight of the solvents.

In addition to the above-described solute and solvent components, the electrolyte for an electrolytic capacitor of the present invention contains metal oxide particles. By adding metal oxide particles to the electrolyte, the electrolyte can be improved in withstand voltage property while maintaining high electric conductivity. Examples of metal oxide particles to be used include silica, aluminosilicate and aluminosilicate-coated silica. The metal oxide particles preferably have an average particle diameter in the range of 5 to 100 nm, more preferably 10 to 50 nm. The amount of the metal oxide particles added is preferably in the range of 0.5 to 20% by weight, further preferably 1 to 15% by weight, especially preferably 3 to 15% by weight, based on the total weight of the quaternary amidinium salt(s) and the solvent(s) (i.e., the total weight of the electrolyte).

As a method of adding metal oxide particles which are substantially not dissolved in a solvent, generally preferred is a method in which the metal oxide particles are added in the form of metal oxide organosol obtained by dispersing the particles in an appropriate organic dispersion medium. Preferred examples of dispersion media for the organosol include a lactone, a cyclic sulfone and ethylene glycol which are used as a solvent for the electrolyte. When using these, the properties of the basic electrolyte are not adversely affected, and the metal oxide particles are easily dispersed in the electrolyte.

From the viewpoint of improving the withstand voltage property, the electrolyte for an electrolytic capacitor of the present invention preferably contains an acidic phosphorus compound, together with the above-mentioned metal oxide particles. Preferred examples of the acidic phosphorus compounds include phosphoric acid compounds such as dibutyl phosphate, bis(2-ethylhexyl) phosphate, diisodecyl phosphate, dipalmityl phosphate and distearyl phosphate; phosphonic acid compounds such as butyl butylphosphonate, (2-ethylhexyl) 2-ethylhexylphosphonate and phosphorous acid; and phosphinic acid compounds such as dimethylphosphinic acid, dibutylphosphinic acid and diphenylphosphinic acid. Especially preferred are dibutyl phosphate, bis(2-ethylhexyl) phosphate, (2-ethylhexyl) 2-ethylhexylphosphonate and phosphorous acid. The amount of the acidic phosphorus compound added is preferably in the range of 0.1 to 10% by weight, especially preferably 0.5 to 5% by weight, based on the total weight of the quaternary amidinium salt(s) and the solvent(s) (i.e., the total weight of the electrolyte).

In the electrolyte for an electrolytic capacitor of the present invention, if desired, components other than the above-described solutes and solvents can be added. Examples of such additives include nitro compounds such as nitrophenol added for the purpose of suppressing generation of hydrogen gas when applying a voltage to the electrolyte, and surfactants such as polyethylene glycol added for the purpose of improving the wettability of the electrolyte to an electrode or a separator.

The electrolyte for an electrolytic capacitor of the present invention can be obtained by mixing and stirring the above-mentioned components. In the mixing, it is necessary that the metal oxide particles be sufficiently dispersed in the electrolyte.

The present invention also provides an electrolytic capacitor using the above-described electrolyte for an electrolytic capacitor.

With respect to the structure and material of the electrolytic capacitor of the present invention, there is no particular limitation as long as the electrolytic capacitor uses the above electrolyte for an electrolytic capacitor. Therefore, all of the electrolytic capacitors conventionally used and the electrolytic capacitors recently proposed which use the electrolyte for an electrolytic capacitor of the present invention are include in the scope of the present invention.

Figure 2:
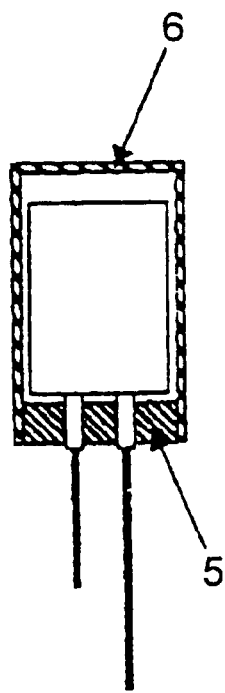
FIG. 2 is a cross-sectional view of an electrolytic capacitor.

As a representative example for a construction of the electrolytic capacitor of the present invention, there can be mentioned the spirally wound-form element structure shown in FIGS. 1 and 2. In this example, a separator (3) is disposed between an anode foil (1). and a cathode foil (2) opposed thereto, and they are spirally wound together.

This is placed in an outer casing (6) made of aluminum, and the casing is sealed by a sealing material (5) such as a phenolic resin laminated sheet, polypropylene and polyphenylene sulfide, intermediated by a packing such as a butyl rubber, an ethylene propylene rubber and a silicone rubber, to give an electrolytic capacitor. The electrolyte for an electrolytic capacitor of the present invention is used in a way such that the separator (3) disposed between the anode foil and the cathode foil is impregnated with the electrolyte. As materials for the separator, kraft paper or manila paper is generally used, however the material for the separator is not particularly limited to these.

The electrolytic capacitor of the present invention has low impedance at high frequencies, high electric conductivity, and high withstand voltage property as well as excellent stability at high temperatures. Therefore, the electrolytic capacitor of the present invention can be advantageously used as an electrolytic capacitor which is required to have low impedance, high heat resistance and prolonged life. Specifically, the electrolytic capacitor of the present invention can be advantageously used as an electrolytic capacitor at rated voltage of up to 100 V.

Hereinbelow, the present invention will be described in more detail with-reference to the following examples. The materials, amounts, compositions and operations described below can be changed as long as the desired effects of the present invention are not sacrificed. Therefore, the following illustrative examples should not be construed as limiting the scope of the present invention.

EXAMPLES 1 TO 4 AND COMPARATIVE EXAMPLES 1 TO 4

The ingredients were mixed together according to the compositions as shown in Table 1 and the solid ingredients were dissolved or dispersed uniformly to prepare electrolytes. In the table, the amounts of each of the ingredients are given by parts by weight. Silica was used in the form of ethylene glycol sol with an average particle diameter of about 25 nm, and this sol was added to the basic electrolyte (comprised of a solute and a solvent) to prepare electrolytes having predetermined compositions.

With respect to each of the electrolytes prepared, electric conductivity, withstand voltage property and thermal stability were evaluated.

First, electric conductivity of an electrolyte at 25° C. was measured. Subsequently, an aluminum electrolytic capacitor was prepared having a structure in which the spirally wound-form element shown in FIG. 1 was impregnated with the electrolyte and placed in an aluminum outer casing, which was sealed by a butyl rubber. A constant current of 10 mA was applied to the thus prepared electrolytic capacitor at 105° C. to obtain a voltage-time curve. The voltage at which the first spike or scintillation was observed in the voltage-time ascending curve obtained was taken as a withstand voltage value. Specifications of the aluminum electrolytic capacitor used were such that casing size was $10^\Phi \times 20^L$, rated voltage was 200 V, and capacitance was 20 µF. The results of the measurements of electric conductivity and withstand voltage are shown in Table 1.

ance value after the load test, exhibiting excellent thermal stability. On the other hand, the electrolyte in Comparative Example 3 using benzoic acid had excellent withstand voltage property at an initial stage, however, the impedance considerably increased due to its poor stability at high temperatures, so that the deterioration of the properties of the capacitor was remarkable.

TABLE 1

|  | Example 1 | Example 2 | Example 3 | Example 4 | Comp. ex. 1 | Comp. ex. 2 | Example 5 | Comp. ex. 3 |
|---|---|---|---|---|---|---|---|---|
| Composition |  |  |  |  |  |  |  |  |
| Quaternary amidinium salicylate | 20 | 20 |  | 20 |  |  |  |  |
| Quaternary amidinium 3-hydroxy-2-naphthoate |  |  | 20 |  |  |  |  |  |
| Quaternary amidinium hydrogenmaleate |  |  |  |  | 20 |  |  |  |
| Quaternary amidinium hydrogenphthalate |  |  |  |  |  | 20 | 20 |  |
| Quaternary amidinium benzoate |  |  |  |  |  |  |  | 20 |
| γ-Butyrolactone | 64 | 64 | 64 | 64 | 80 | 80 | 64 | 64 |
| Ethylene glycol | 16 | 16 | 16 | 16 |  |  | 16 | 16 |
| Silica . | 6 | 6 | 6 | 6 |  |  | 6 | 6 |
| Dibutyl phosphate |  | 2 | 2 |  |  |  | 2 | 2 |
| Di(2-ethylhexyl) phosphate |  |  |  | 2 |  |  |  |  |
| Evaluation |  |  |  |  |  |  |  |  |
| Electric conductivity (mS/cm) | 8.9 | 8.3 | 6.1 | 8.0 | 15.6 | 10.8 | 7.2 | 7.4 |
| Withstand voltage (V) | 130 | 140 | 115 | 145 | 50 | 65 | 110 | 185 |

(Note) All the quaternary amidinium salts are 1-ethyl-2,3-dimethylimidazolinium salts.

Next, an electrolytic capacitor at rated voltage of 100 V was prepared using the electrolyte of the present invention, and evaluated in respect of thermal stability. Specifications of the aluminum electrolytic capacitor used were such that casing size was $10^\Phi \times 20^L$, rated voltage was 100 V, and capacitance was 55 µF. With respect to the capacitor prepared, a load test was conducted at a temperature as high as 125° C. for 1,000 hours, and changes in capacitance and impedance were individually measured. The capacitance and impedance of the capacitor were measured at 120 Hz and 100 kHz, respectively. The results are shown in Table 2.

TABLE 2

|  | Capacitance changing ratio (%) | Impedance (Ω) Before test | Impedance (Ω) After test |
|---|---|---|---|
| Example 2 | −7 | 0.3 | 1.2 |
| Comp. ex. 3 | −7 | 0.3 | 10 |

In the load test at a high temperature, generally, the higher the thermal stability of the electrolyte used, the smaller the change in the impedance value, and a capacitor having a smaller change in the impedance value is more preferred.

From a comparison between the electrolyte in Example 2 of the present invention and the electrolyte in Comparative Example 3 (using benzoic acid), it was shown that the electrolyte using salicylic acid which is a hydroxy-substituted aromatic monocarboxylic acid had a smaller imped-

EXAMPLES 6 TO 9 AND COMPARATIVE EXAMPLE 4

The ingredients in the compositions shown in Table 3 were mixed together and the solid ingredients were dissolved or dispersed uniformly to prepare electrolytes. In the table, the amounts of each of the ingredients are given by parts by weight. Silica was used in the form of γ-butyrolactone sol or ethylene glycol sol having an average particle diameter of about 25 nm, and this sol was added to the basic electrolyte (comprised of a solute and a solvent) to prepare electrolytes having predetermined compositions.

With respect to each of the electrolytes prepared, electric conductivity, withstand voltage property and thermal stability were evaluated.

First, electric conductivity of an electrolyte at 25° C. was measured. Subsequently, an aluminum electrolytic capacitor was prepared having a structure in which the spirally wound-form element shown in FIG. 1 was impregnated with the electrolyte and placed in an aluminum outer casing, which was sealed by a butyl rubber. A constant current of 10 mA was applied to the thus prepared electrolytic capacitor at 105° C. to obtain a voltage-time curve. The voltage at which the first spike or scintillation was observed in the voltage-time ascending curve obtained was taken as a withstand voltage value. Specifications of the aluminum electrolytic capacitor used were such that casing size was $10^\Phi \times 20^L$, rated voltage was 200 V, and capacitance was 20 µF. The results of the measurements of electric conductivity and withstand voltage are shown in Table 3.

TABLE 3

|  | Example 6 | Example 7 | Example 8 | Example 9 | Comp. ex. 4 |
|---|---|---|---|---|---|
| Composition |  |  |  |  |  |
| Quaternary amidinium hydrogenphthalate | 10 | 10 | 10 | 10 | 10 |
| γ-Butyrolactone | 81 | 81 | 36 | 90 | 72 |
| Sulfolane |  |  | 36 |  |  |
| Ethylene glycol | 9 | 9 | 18 |  | 18 |
| Silica | 6 | 6 | 6 | 6 |  |
| Dibutyl phosphate |  | 2 | 2 | 2 | 2 |
| Evaluation |  |  |  |  |  |
| Electric conductivity (mS/cm) | 5.4 | 4.6 | 3.0 | 5.4 | 4.7 |
| Withstand voltage (V) | 115 | 165 | 170 | 90 | 90 |

(Note) All the quaternary amidinium salts are 1-ethyl-2,3-dimethylimidazolinium salts.

Next, an electrolytic capacitor at rated voltage of 80 V was prepared using the electrolyte of the present invention, and was evaluated in respect of thermal stability. Specifications of the aluminum electrolytic capacitor used were such that casing size was $10^\Phi \times 20^L$, rated voltage was 80 V, and capacitance was 120 μF. With respect to the capacitor prepared, a load test was conducted at a temperature as high as 125° C. for 1,000 hours, and changes in capacitance and impedance were individually measured. The capacitance and impedance of the capacitor were measured at 120 Hz and 100 kHz, respectively. The results are shown in Table 4.

TABLE 4

|  | Capacitance changing ratio (%) | Impedance (Ω) | |
|---|---|---|---|
|  |  | Before test | After test |
| Example 7 | −3 | 0.15 | 0.19 |
| Example 9 | −5 | 0.13 | 0.25 |

EXAMPLES 10 TO 22 AND COMPARATIVE EXAMPLES 5 TO 9

The ingredients in the compositions shown in Table 5 were mixed together and the solid ingredients were dissolved or dispersed uniformly to prepare electrolytes. In the table, the amounts of each of the ingredients are given by parts by weight. Silica was used in the form of γ-butyrolactone sol or ethylene glycol sol having an average particle diameter of about 25 nm, and this sol was added to the basic electrolyte (comprised of a solute and a solvent) to prepare electrolytes having predetermined compositions.

With respect to each of the electrolytes prepared, electric conductivity, withstand voltage property and thermal stability were evaluated.

First, electric conductivity of an electrolyte at 25° C. was measured. Then, an aluminum electrolytic capacitor was prepared having a structure in which the spirally wound-form element shown in FIG. 1 was impregnated with the electrolyte and placed in an aluminum outer casing, which was sealed by a butyl rubber. A constant current of 10 mA was applied to the thus prepared electrolytic capacitor at 105° C. to obtain a voltage-time curve. The voltage at which the first spike or scintillation was observed in the voltage-time ascending curve obtained was taken as the withstand voltage value. Specifications of the aluminum electrolytic capacitor used were such that casing size was $10^\Phi \times 20^L$, rated voltage was 200 V and capacitance was 20 μF. The results of the measurements of electric conductivity and withstand voltage are shown in Table 5.

TABLE 5

| | Example 10 | Example 11 | Example 12 | Example 13 | Example 14 | Example 15 | Example 16 | Example 17 | Example 18 |
|---|---|---|---|---|---|---|---|---|---|
| Quaternary amidinium salicylate | 10 | 10 | 10 | 10 | 10 | 10 | | | |
| Quaternary amidinium hydrogenphthalate | | | | | | | 10 | | |
| Ammonium benzoate | | | | | | | 10 | | 10 |
| γ-Butyrolactone | 80 | 80 | | | 90 | | | 20 | 20 |
| Sulfolane | | | 40 | 40 | | 45 | 45 | 30 | 30 |
| 3-Methylsulfolane | | | 40 | 40 | | 45 | 45 | 30 | 30 |
| Ethylene glycol | 10 | 10 | 10 | 10 | | | | 10 | 10 |
| Silica | 6 | 6 | 6 | 6 | 6 | 6 | 6 | 6 | 6 |
| Dibutyl phosphate | | 2 | 2 | 2 | 2 | 2 | 2 | 2 | 2 |
| Electric conductivity (mS/cm) at 25° C. | 5.7 | 5.3 | 3.3 | 2.5 | 5.8 | 3.4 | 2.4 | 2.7 | 2.6 |
| Withstand voltage (V) at 105° C. | 115 | 165 | 170 | 160 | 160 | 165 | 170 | 170 | 215 |
| Product impedance initial value 20° C. (Ω/ at 100 kHz) | 0.19 | 0.20 | 0.31 | 0.40 | 0.18 | 0.30 | 0.41 | 0.37 | 0.38 |
| Product impedance Initial value −10° C. (Ω/ at 100 kHz) | 0.34 | 0.38 | 0.38 | 1.2 | 0.31 | 0.72 | 1.19 | 1.18 | 1.22 |
| Ratio between initial impedance values at two different temperatures | 1.8 | 1.9 | 2.5 | 3.0 | 1.7 | 2.4 | 2.9 | 3.2 | 3.2 |
| Impedance value (20° C.) after test at 125° C. for 2,000 hours | 0.24 | 0.25 | 0.38 | 0.49 | 0.22 | 0.35 | 0.48 | 0.45 | 0.49 |
| Ratio between impedance values (20° C.) before and after test | 1.3 | 1.3 | 1.2 | 1.2 | 1.2 | 1.2 | 1.2 | 1.2 | 1.3 |

| | Example 19 | Example 20 | Example 21 | Example 22 | Comp. ex. 5 | Comp. ex. 6 | Comp. ex. 7 | Comp. ex. 8 | Comp. ex. 9 |
|---|---|---|---|---|---|---|---|---|---|
| Quaternary amidinium salicylate | 10 | 10 | 10 | 7 | 10 | 10 | 10 | 7 | |
| Quaternary amidinium hydrogenphthalate | | | | 3 | | | | 3 | |
| Ammonium benzoate | | | | | | | | | 15 |
| γ-Butyrolactone | 80 | | | 80 | 80 | | | 80 | 85 |
| Sulfolane | | 40 | 40 | | | 45 | 90 | | |
| 3-Methylsulfolane | | 40 | 40 | | | 45 | | | |
| Ethylene glycol | 10 | 10 | 10 | 10 | 10 | | 10 | 10 | |
| Silica | 6 | 6 | 6 | 6 | | 2 | 2 | 2 | |
| Dibutyl phosphate | 2 | 2 | 2 | 2 | | 2.5 | 5.1 | 5.2 | 3.3 |
| Electric conductivity (mS/cm) at 25° C. | 4.7 | 3.2 | 2.4 | 5.0 | 5.1 | 75 | 90 | 85 | 260 |
| Withstand voltage (V) at 105° C. | 225 | 200 | 205 | 190 | 65 | Lack of voltage | | | 0.30 |
| Product impedance initial value 20° C. (Ω/ at 100 kHz) | 0.22 | 0.31 | 0.41 | 0.21 | | | | | 1.20 |
| Product impedance Initial value −10° C. (Ω/ at 100 kHz) | 0.42 | 0.78 | 1.35 | 0.40 | | | | | 4.0 |
| Ratio between initial impedance values at two different temperatures | 1.9 | 2.5 | 3.3 | 1.9 | | | | | |
| Impedance value (20° C.) after test at 125° C. for 2,000 hours | 0.29 | 0.40 | 0.52 | 0.27 | | | | | 0.62 |
| Ratio between impedance values (20° C.) before and after test | 1.3 | 1.3 | 1.3 | 1.3 | | | | | 2.1 |

In each of Examples 10 to 22 and Comparative Examples 5 to 9 shown in Table 5, 1-ethyl-2,3-dimethylimidazolinium is used as an amidinium. When a comparison is made with respect to the withstand voltage property between Examples and Comparative Examples, all the electrolytes in Examples have high withstand voltages of more than 100 V and hence, they are preferably used in an aluminum electrolytic capacitor to which a higher voltage is applied.

Next, an electrolytic capacitor at rated voltage of 100 V at capacitance of 56 μF was prepared using the electrolyte of the present invention, and was evaluated in respect of impedance. In Table 5, impedance values at 20° C. and −10° C. and the ratio between these values are shown as evaluation items for the initial properties of the capacitor, and an impedance value after the load test at 125° C. for 2,000 hours and the ratio between the impedance values before and after the load test are shown as evaluation items for the long-lived properties of the capacitor. Each impedance was measured at 100 kHz.

When using the electrolytes in Comparative Examples 5 to 8, a capacitor at rated voltage of 100 V could not be prepared due to its poor withstand voltage property. Therefore, in Comparative Example 9, an electrolytic capacitor was prepared using an electrolyte comprising ammonium benzoate as a solute and ethylene glycol as a solvent, and the impedance properties were compared with those in Examples.

Generally, impedance properties advantageous to an electrolytic capacitor are such that the impedance value is smaller, change in the impedance value at a given temperature is smaller, and changes in the impedance value before and after heating or application of a voltage is smaller.

All the ratio between the initial impedance values at two different temperatures, the impedance value after the load test and the ratio between the impedance values before and after the load test in Examples of the present invention are respectively smaller than the corresponding values in Comparative Example 9. From these results, it is apparent that an electrolytic capacitor having excellent impedance properties can be obtained using the electrolyte of the present invention.

INDUSTRIAL APPLICABILITY

As is clearly shown in the above examples, the electrolyte of the present invention has high electric conductivity free of problems from a practical point of view and exhibits excellent withstand voltage property. In addition, it is apparent that the capacitance changing ratio between before and after the load test at a temperature as high as 125° C. for 1,000 or 2,000 hours and the impedance value are small, and hence, the electrolyte of the present invention has excellent thermal stability.

Therefore, by using the electrolyte for an electrolytic capacitor of the present invention, not only can an electrolytic capacitor at rated voltage of more than 35 V be stably supplied wherein the capacitor can realize a prolonged life for practical use, but also such an electrolytic capacitor can be produced at a low cost.

The invention claimed is:

1. An electrolyte for an electrolytic capacitor, said electrolyte comprising: a solvent; at least one quaternary amidinium salt selected from the group consisting of a quaternary amidinium salt of a hydroxy-substituted aromatic monocarboxylic acid and a quaternary amidinium salt of phthalic acid; and metal oxide particles.

2. The electrolyte according to claim 1, wherein said at least one quaternary amidinium salt is contained in an amount of 5 to 40% by weight, based on the total weight of said quaternary amidinium salt and said solvent.

3. The electrolyte according to claim 1, wherein said hydroxy-substituted aromatic monocarboxylic acid is at least one compound selected from the group consisting of salicylic acid, 4-hydroxybenzoic acid and 3-hydroxy-2-naphthoic acid.

4. The electrolyte according to claim 1, wherein said quaternary amidinium is 1-ethyl-2,3-dimethylimidazolinium or 1,2,3,4-tetramethylimidazolinium.

5. The electrolyte according to claim 1, wherein said solvent is at least one solvent selected from the group consisting of a lactone and a cyclic sulfone.

6. The electrolyte according to claim 5, wherein said lactone is γ-butyrolactone and said cyclic sulfone is at least one cyclic sulfone selected from the group consisting of sulfolane and 3-methylsulfolane.

7. The electrolyte according to claim 5, wherein said solvent further comprises ethylene glycol.

8. The electrolyte according to claim 7, wherein the ratio between the total weight of said at least one solvent selected from the group consisting of a lactone and a cyclic sulfone and the weight of said ethylene glycol is 99:1 to 70:30.

9. The electrolyte according to claim 1, wherein said solvent comprises γ-butyrolactone and a solvent other than a cyclic sulfone, wherein said solvent is contained in an amount of 40 parts by weight or less, relative to 100 parts by weight of γ-butyrolactone.

10. The electrolyte according claim 1, wherein said metal oxide particles are contained in an amount of 0.5 to 20% by weight, based on the total weight of said electrolyte.

11. The electrolyte according to claim 10, wherein said metal oxide particles are particles of a metal oxide selected from the group consisting of silica, aluminosilicate and aluminosilicate-coated silica, and said metal oxide particles have an average particle diameter of 5 to 100 nm.

12. The electrolyte according to claim 1, further comprising an acidic phosphoric acid compound in an amount of 0.5 to 10% by weight, based on the total weight of said electrolyte.

13. The electrolyte according to claim 12, wherein said acidic phosphoric acid compound is at least one compound selected from the group consisting of dibutyl phosphate, di(2-ethylhexyl) phosphate, (2-ethylhexyl) 2-ethylhexylphosphonate and phosphorous acid.

14. An electrolytic capacitor using the electrolyte according to claim 1.

15. An electrolytic capacitor comprising an anode-side electrode having an electrically insulating oxide film on an electrode surface, a cathode-side electrode opposed thereto, and a separator disposed between said anode-side electrode and said cathode-side electrode, the electrolyte according to claim 1 is retained in said separator.

* * * * *